(12) United States Patent  
Chen et al.

(10) Patent No.: US 8,582,629 B1
(45) Date of Patent: Nov. 12, 2013

(54) WIRELESS SIGNAL TRANSCEIVING APPARATUS

(75) Inventors: Peng-Sen Chen, Hsinchu County (TW); Ming-Chou Chiang, Hsinchu County (TW)

(73) Assignee: ISSC Technologies Corp., Hsinchu (TW)

( * ) Notice: Subject to any disclaimer, the term of this patent is extended or adjusted under 35 U.S.C. 154(b) by 0 days.

(21) Appl. No.: 13/586,842

(22) Filed: Aug. 15, 2012

(30) Foreign Application Priority Data

Apr. 26, 2012 (TW) .............................. 101114937 A

(51) Int. Cl.
*H04L 5/16* (2006.01)
*H04B 1/38* (2006.01)

(52) U.S. Cl.
USPC .............................. 375/219; 375/295; 375/316

(58) Field of Classification Search
USPC ...................... 375/219, 222, 295, 316; 326/30
See application file for complete search history.

(56) References Cited

U.S. PATENT DOCUMENTS

| 2003/0048834 A1* | 3/2003 | Feher ............................ 375/219 |
| 2007/0098057 A1* | 5/2007 | Mori et al. ..................... 375/219 |
| 2010/0080270 A1* | 4/2010 | Chen et al. ..................... 375/219 |

* cited by examiner

*Primary Examiner* — Ted Wang
(74) *Attorney, Agent, or Firm* — Jianq Chyun IP Office

(57) ABSTRACT

A wireless signal transceiving apparatus is provided. The wireless signal transceiving apparatus includes a signal transceiving-end circuit, a transceiving amplify module, an output amplify module, a mixer, a frequency selecting filter, switch modules a first base-band signal transceiver and a second base-band signal transceiver. The transceiving amplify module receives and amplifies a signal from an antenna or the mixer. The output amplify module amplifies the signal from the mixer. The frequency selecting filter filters the signal from the mixer, the first base-band signal transceiver or the second base-band signal transceiver according to the mode selecting signal. The first base-band signal transceiver and the second base-band signal transceiver receive the signal generated by the frequency selecting filter and/or respectively transmit the first and the second base-band output signal. The switch modules turn on or turn off transmission paths for the signal according to the mode selecting signal.

13 Claims, 3 Drawing Sheets

WIRELESS SIGNAL TRANSCEIVING APPARATUS

CROSS-REFERENCE TO RELATED APPLICATION

This application claims the priority benefit of Taiwan application serial no. 101114937, filed on Apr. 26, 2012. The entirety of the above-mentioned patent application is hereby incorporated by reference herein and made a part of this specification.

BACKGROUND

1. Technology Field

The present invention relates to a wireless signal transceiving apparatus, and particularly to a multi-standard wireless signal transceiving apparatus.

2. Description of Related Art

With the widespread of smart phones, a multi-standard electronic device which has different wireless communication standards integrated in the device has become a popular choice. For instance, the multi-standard which includes Bluetooth and wireless LAN are usually applied and integrated in modern mobile phones.

Referring to FIG. 1, FIG. 1 illustrates a conventional multi-standard wireless signal transmission apparatus 100. The wireless signal transmission apparatus 100 employs a single antenna ANT to support the transceiving operation of the Bluetooth signal and the wireless LAN signal. The wireless signal transmission apparatus 100 has two transceiving channels which operates independently. The transceiving channel for receiving Bluetooth signals is composed of amplifiers 131, 132, a mixer 141, filters 151, 152, an amplifier 161, an analog-to-digital converter (ADC) 171, a digital-to-analog converter (DAC) 172 and a Bluetooth base-band signal generator 181, and the transceiving channel for receiving wireless LAN signals is composed of amplifiers 133, 134, a mixer 142, filters 153, 154, an amplifier 162, an analog-to-digital converter (ADC) 173, a digital-to-analog converter (DAC) 174 and a wireless LAN base-band signal generator 182.

It should be noted that, in the conventional multi-standard wireless signal transmission apparatus 100, only the antenna ANT and an antenna switch 120 are shared by both channels. Otherwise, both channels for respectively transceiving the Bluetooth signal and the wireless LAN signal require independent hardware devices for processing the signal transceiving. Hence, the requirement of the hardware device number will raise the production cost. Also, assembling a large number of the devices in a smart phone with limited size will increase the fabrication difficulty.

SUMMARY OF THE INVENTION

The present invention provides a wireless signal transceiving apparatus for reducing the number of the hardware circuit and lowering the production cost.

The present invention provides a wireless signal transceiving apparatus. The wireless signal transceiving apparatus includes a signal transceiving-end circuit, a transceiving amplify module, an output amplify module, a mixer, a frequency selecting filter, a first switch module, a first and a second base-band signal transceiver and a second switch module. The signal transceiving-end circuit is coupled to an antenna. The transceiving amplify module coupled to the signal transceiving-end circuit receives and amplifies a receiving signal from the antenna or amplifies and transmits an output signal to the signal transceiving-end circuit. The output amplify module coupled to the transceiving amplify module and the signal transceiving-end circuit amplifies and transmits the output signal to the signal transceiving-end circuit. The mixer is coupled to the transceiving amplify module and the output amplify module. The mixer receives the receiving signal which is amplified and mixes the receiving signal for rendering a mixed receiving signal, or the mixer mixes a preamble output signal for rendering the output signal. The frequency selecting filter coupled to the mixer filters the mixed receiving signal, or filters one of the first and the second base-band signal to generate the preamble output signal according to a mode selecting signal. The first switch module coupled between the mixer and the frequency selecting filter transmits the mixed receiving signal to the frequency selecting filter or transmits the preamble output signal to the mixer according to the mode selecting signal. The first and the second base-band signal transceiver are coupled to the frequency selecting filter. The first base-band signal transceiver receives the mixed receiving signal which is filtered and/or transmits a first base-band output signal. The second base-band signal transceiver receives the mixed receiving signal which is filtered and/or transmits a second base-band output signal. The second switch module coupled among the first base-band signal transceiver, the second base-band signal transceiver and the frequency selecting filter turns on transmitting paths for the first base-band output signal, the second base-band output signal and the mixed receiving signal which is filtered according to the mode selecting signal.

Based on the above description, while transmitting signals through the antenna, the filter and the mixer of the wireless signal transceiving apparatus which are used for processing the first and the second base-band output signals are common and are shared by different channels. In addition, while receiving the receiving signal from the antenna, the amplifier, the mixer and the filter which are used for processing the signals according to the different base-bands can be common and shared by different channels as well. Therefore, the space for setting the hardware in the wireless signal transceiving apparatus can be reduced, and the production cost of the wireless signal transceiving apparatus is reduced as well.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
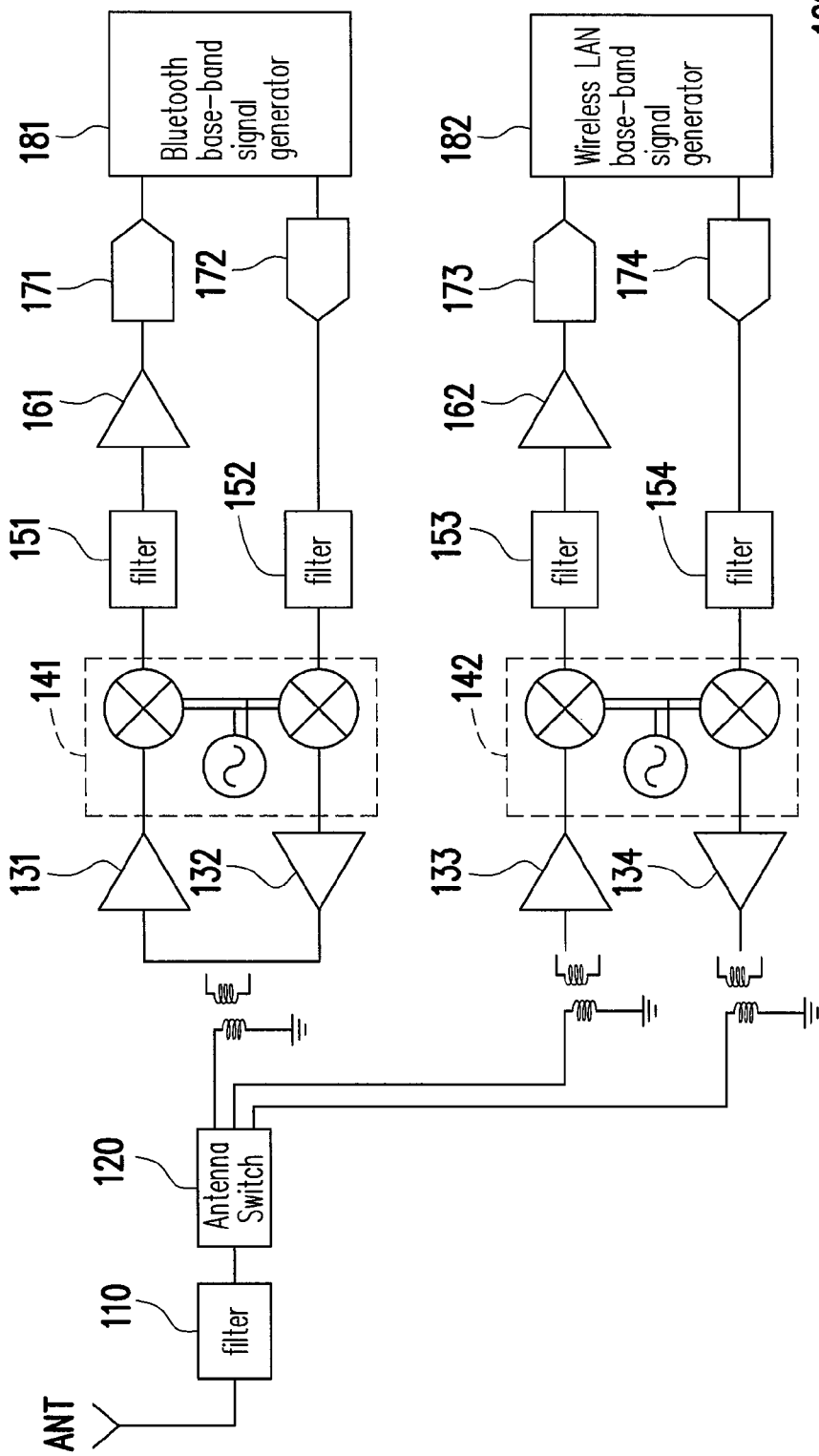
FIG. 1 illustrates a conventional multi-standard wireless signal transmission apparatus 100.
Figure 2:
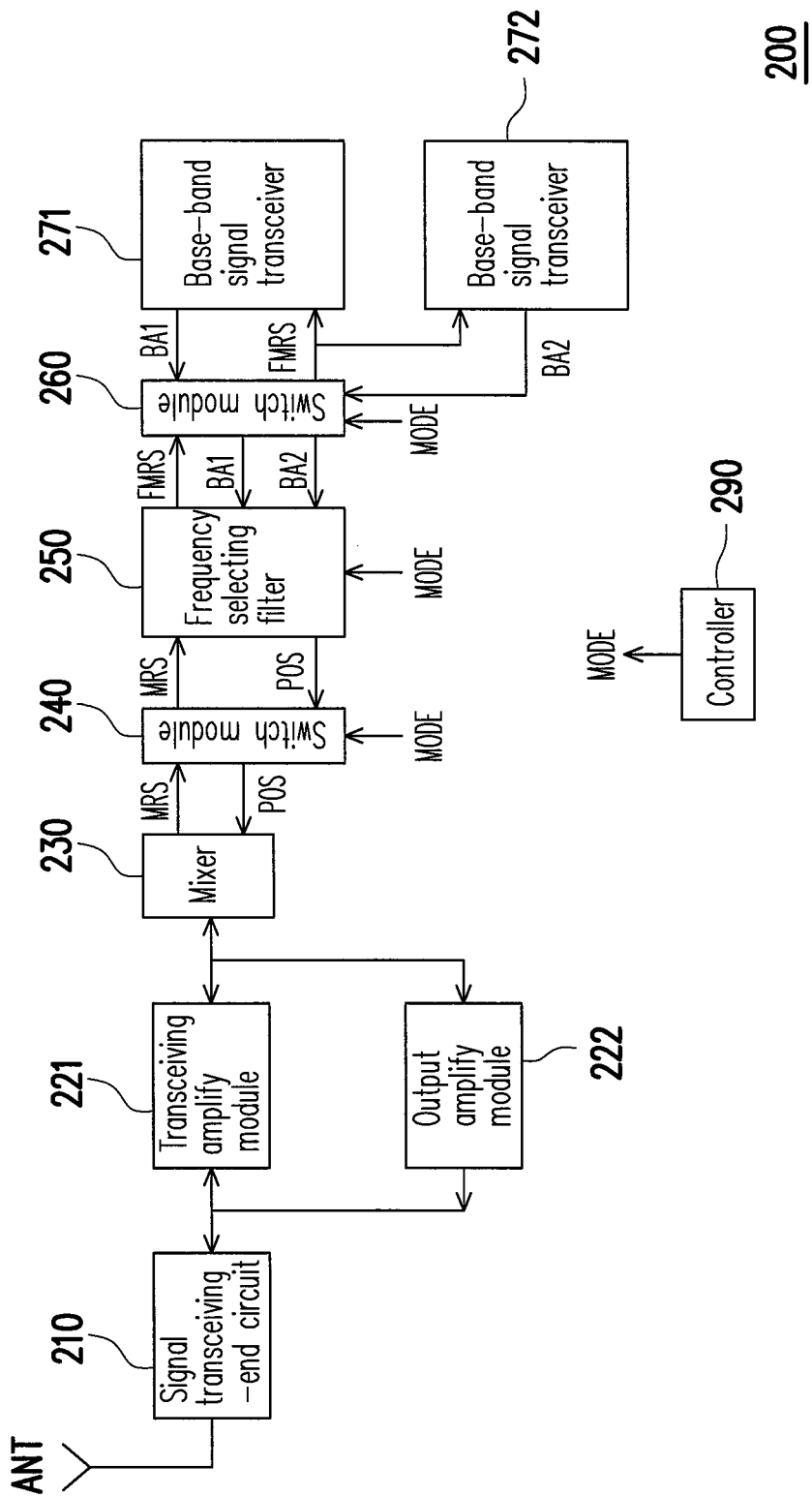
FIG. 2 illustrates a wireless signal transceiving apparatus 200 according to an embodiment of the present invention.

Referring to FIG. 2 hereinafter, FIG. 2 illustrates a wireless signal transceiving apparatus 200 according to an embodiment of the present invention. The wireless signal transceiving apparatus 200 includes a signal transceiving-end circuit 210, a transceiving amplify module 221, an output amplify module 222, a mixer 230, a switch module 240, a frequency selecting filter 250, another switch module 260 and base-band signal transceivers 271 and 272. The signal transceiving-end circuit 210 is coupled to an antenna ANT. The transceiving amplify module 221 coupled to the signal transceiving-end circuit 210 receives and amplifies a receiving signal from the antenna ANT or amplifies and transmits an output signal to the signal transceiving-end circuit 210. The output amplify module 222 is coupled to the transceiving amplify module 221 and the signal transceiving-end circuit 210. The output amplify module 222 amplifies and transmits the output signal to the signal transceiving-end circuit 210.

In the present embodiment, the transceiving amplify module 221 receives the receiving signal transmitted from the antenna ANT, and amplifies the receiving signal and transmits the amplified receiving signal to the mixer 230. Especially, the receiving signal can be a Bluetooth signal or a wireless LAN (WLAN) signal. Furthermore, the transceiving amplify module 221 also receives the output signal which is the Bluetooth signal transmitted from the mixer 230, and amplifies the output signal and transmits the amplified output signal to the signal transceiving-end circuit 210. In addition, the signal transceiving-end circuit 210 radiates the Bluetooth output signal through the antenna ANT.

Also, the output amplify module 222 of the present embodiment is used for receiving the output signal which is the wireless LAN signal, amplifying the wireless LAN output signal, and transmitting the output signal to the signal transceiving-end circuit 210. Furthermore, the wireless LAN output signal is transmitted to the antenna ANT by the signal transceiving-end circuit 210 for radiating the output signal through the antenna ANT.

The mixer 230 is coupled to the transceiving amplify module 221 and the output amplify module 222. The mixer 230 receives the receiving signal which is amplified from the transceiving amplify module 221 for mixing the receiving signal with a reference wave signal, and generates a mixed receiving signal (MRS). The mixer 230 also mixes a preamble output signal (POS) with the reference wave signal in order to generate the output signal and transmit the output signal to the transceiving amplify module 221 or the output amplify module 222.

The switch module 240 is coupled between the mixer 230 and the frequency selecting filter 250. The switch module 240 transmits the mixed transceiving signal MRS to the frequency selecting filter 250 or transmits the preamble output signal POS to the mixer 230 according to a mode selecting signal MODE. It should be noted that, the mode selecting signal MODE can be used to instruct the wireless signal transceiving apparatus 200 to execute a signal transmitting operation or a signal receiving operation. When the mode selecting signal MODE is used to instruct the wireless signal transceiving apparatus 200 to execute the signal transmitting operation, the switch module 240 transmits the preamble output signal (POS) to the mixer 230. By contrast, when the mode selecting signal MODE is used to instruct the wireless signal transceiving apparatus 200 to execute the signal receiving operation, the switch module 240 transmits the mixed receiving signal MRS to the frequency selecting filter 250.

The frequency selecting filter 250 is coupled to the mixer 230 through the switch module 240. According to the mode selecting signal MODE, the frequency selecting filter 250 filters the mixed receiving signal MRS or filters one of the base-band output signals BA1, BA2 for rendering the preamble output signal POS. It should be noted that, when the mode selecting signal MODE instructs the wireless signal transceiving apparatus 200 to execute the signal receiving operation, the frequency selecting filter 250 filters the mixed receiving signal MRS. On the other hand, when the mode selecting signal MODE instructs the wireless signal transceiving apparatus 200 to execute the signal transmitting operation, the frequency selecting filter 250 filters one of the base-band output signals BA1, BA2. Note that the mode selecting signal MODE is further used to instruct which standard of signal should be transceived by the wireless signal transceiving apparatus 200. In the present embodiment, the mode selecting signal MODE is further used to instruct that the signal transceived by the wireless signal transceiving apparatus 200 should be the Bluetooth signal or the wireless LAN signal. Therefore, according to the mode selecting signal MODE, the wireless signal transceiving apparatus 200 selects whether the base-band output signal BA1 (such as the Bluetooth signal) or the base-band output signal BA2 (such as the wireless LAN signal) to be filtered by the frequency selecting filter 250.

The switch module 260 is coupled among the base-band signal transceivers 271, 272 and the frequency selecting filter 250. The transmission paths of the base-band output signal BA1, base-band output signal BA2 and the filtered mixed receiving signal (FMRS) are respectively turned on by the switch module 260 according to the mode selecting signal MODE. To be more specific, switch module 260 executes the signal transmission according to the operation of the wireless signal transceiving apparatus 200 which is instructed by the mode selecting signal MODE. In other words, when the mode selecting signal MODE instructs the wireless signal transceiving apparatus 200 to execute the Bluetooth signal transmitting, the switch module 260 turns on the transmission path to the frequency selecting filter 250 for the base-band output signal BA1; when the mode selecting signal MODE instructs the wireless signal transceiving apparatus 200 to execute the wireless LAN signal transmitting, the switch module 206 turns on the transmission path to the frequency selecting filter 250 for the base-band output signal BA2; when the mode selecting signal MODE instructs the wireless signal transceiving apparatus 200 to execute the Blue Tooth signal or the wireless LAN signal receiving, the transmission path of the filtered mixed receiving signal FMRS is turned on.

The base-band signal transceiver 271 receives the filtered mixed receiving signal FMRS and/or transmits the base-band output signal BA1. The base-band signal transceiver 272 also receives the filtered mixed receiving signal FMRS and/or transmits the base-band output signal BA2. In the present embodiment, the base-band signal transceiver 271 is used to transceive the Bluetooth signal, and the base-band signal transceiver 272 is used to transceive the wireless LAN signal.

From the above description, according to the embodiment of the present invention, the wireless signal transceiving apparatus 200 can execute the transceiving operations of the Bluetooth signal and the wireless LAN signal. Also, the mixer 230, the frequency selecting filter 250 are the common electronic devices, so the size and the production cost of the circuit are effectively reduced.

Furthermore, in the present embodiment, the wireless signal transceiving apparatus 200 further includes a controller 290. The controller 290 is used to generate the mode selecting signal MODE according to the signal format (the transceiving operation of the Blue Tooth signal or the wireless LAN signal) and whether the operation is the signal receiving operation or the signal transmitting operation.

Figure 3:
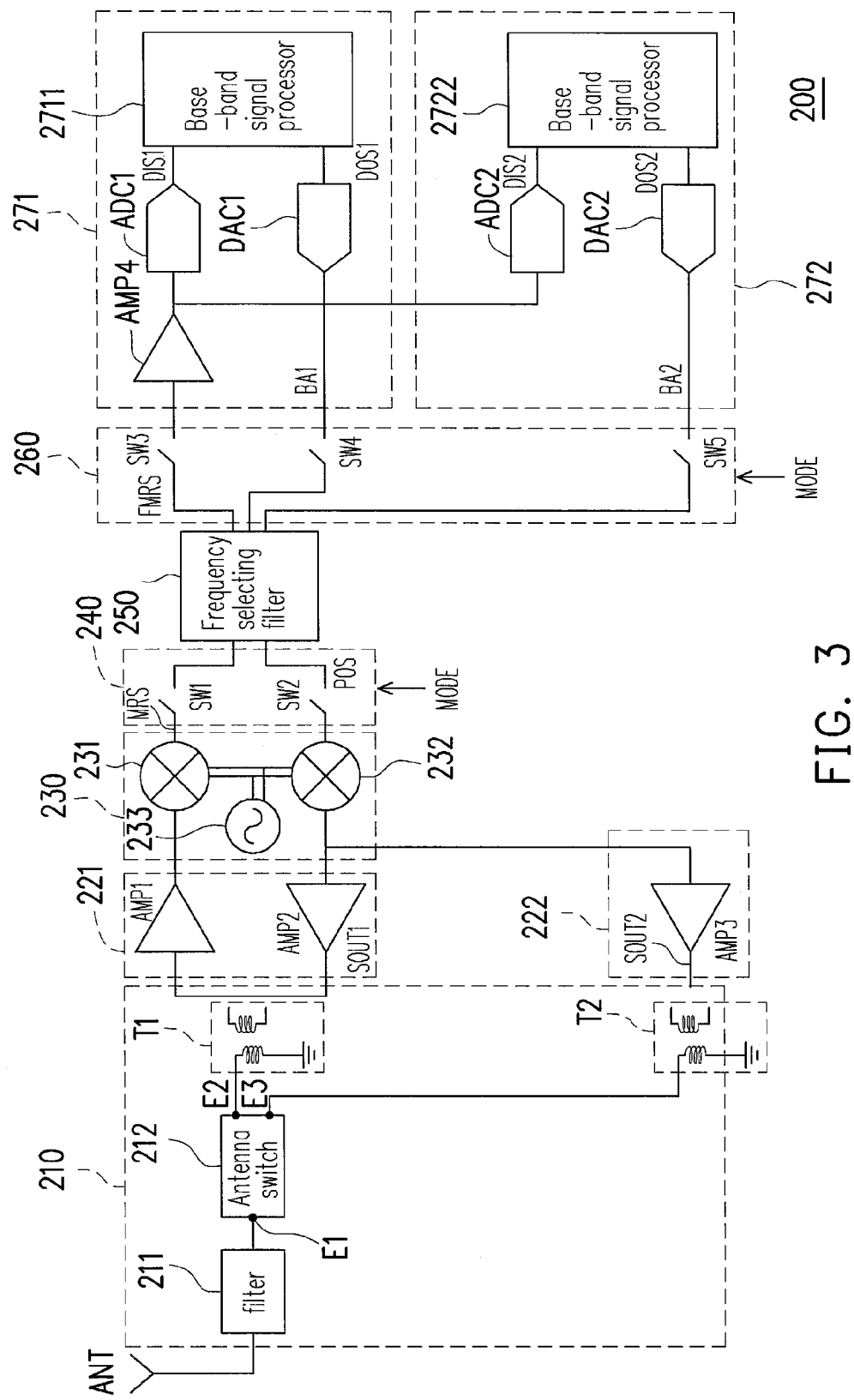
FIG. 3 illustrates a detailed structure of the wireless signal transceiving apparatus 200 according to an embodiment of the present invention.

Referring to FIG. 3 hereinafter, FIG. 3 illustrates a detailed structure of wireless signal transceiving apparatus 200 according to an embodiment of the present invention. The signal transceiving-end circuit 210 includes transformers T1 and T2, an antenna converter 212 and a filter 211. The filter 211 is serially connected within a coupling path of antenna converter 212 coupled to the antenna ANT. The antenna converter 212 has a first end E1, a second end E2 and a third end E3. The first end E1 of the antenna converter 212 is coupled to the antenna ANT through the filter 211. The antenna converter 212 transmits the signal received by the antenna ANT to the second end E2 or the third end E3 of the signal converter 212. Moreover, the antenna converter 212 transmits the signal received by the second end E2 or the third end E3 to the filter 211, and the antenna ANT radiates the signal.

The transformer T1 includes a first side and a second side, where the first side of the transformer T1 is coupled to the second end E2 of the antenna converter 212, and the second side of the transformer T1 is coupled to the transceiving amplify module 221. When the signal received by the antenna ANT is transmitted to the second end E2 of the antenna converter 212, the signal will be transmitted to the first side of the transformer T1 and coupled by the second side of the transformer T1. Thus, the signal received by the antenna ANT is transmitted to the transceiving amplify module 221. On the contrary, when the output signal SOUT1 is transmitted by the transceiving amplify module 221, the output signal SOUT1 received by the second side of the transformer T1 is coupled by the first side of the transformer T1 in order to transmit the output signal SOUT1 to the second end E2 of the antenna converter 212, and the output signal SOUT1 is further transmitted to the antenna ANT through the first end E1 of the antenna converter 212.

In addition, the transformer T2 also includes a first side and a second side, wherein the first side of the transformer T2 is coupled to the third end E3 of the antenna converter 211, and the second side of the transformer T2 is coupled to the transmitting amplify module 222. When the output signal SOUT2 is transmitted by the output amplify module 222, the output signal SOUT2 received by the second side of the transformer T2 which is coupled by the first side of the transformer T2 in order to transmit the output signal SOUT2 to the third end E3 of the antenna converter 212, and the output signal SOUT2 is further transmitted to the antenna ANT through the first end E1 of the antenna converter 212.

The transceiving amplify module 221 includes amplifiers AMP1 and AMP2, where an input end of the amplifier AMP1 receives the receiving signal which is coupled by the second side of the transformer T1. An output end of the amplifier AMP1 is coupled to the mixer 230. According to the present embodiment, the amplifier AMP1 is a low-noise amplifier (LNA) and the gain value of the amplifier AMP1 is adjustable. In addition, an output end of the amplifier AMP2 is coupled to the second side of the transformer T1, and an input end of the amplifier AMP2 is coupled to the mixer 230 for receiving the output signal generated by the mixer 230.

The mixer 230 includes mixer circuits 231, 232 and a reference wave generator 233. The mixer circuit 231 coupled to the output end of the amplifier AMP1 generates the mixed receiving signal MRS by mixing the reference wave signal and the amplified receiving signal. The mixer circuit 232 coupled to the input end of the amplifier AMP2 generates the output signal by mixing the reference wave signal and the preamble output signal POS. The reference wave generator 233 coupled to the mixer circuits 231, 232 are configured to provide the reference wave signal.

The switch module 240 includes switches SW1, SW2. The switch SW1 is serially connected within the coupling path of the mixer circuit 231 coupled to the frequency selecting filter 250. The switch SW1 transmits the mixed receiving signal MRS to the frequency selecting filter 250 according to the mode selecting signal MODE. The switch SW2 is serially connected within the coupling path of the mixer circuit 232 coupled to the frequency selecting filter 250. The switch SW2 transmits the preamble output signal POS to the mixer circuit 232 according to the mode selecting signal MODE. Herein, the states of the switches SW1, SW2 can respectively be turn-on or turn-off, and the states of the switches SW1, SW2 are different.

The switch module 260 includes switches SW3~SW5, and the switch SW3 is serially connected between the frequency selecting filter 250 and the base-band signal transceiver 271. The switch SW3 turns on the transmission path for transmitting the filtered mixed receiving signal FMRS to the base-band signal transceiver 271 according to the mode selecting signal MODE. The switch SW4 is serially connected between the frequency selecting filter 250 and the base-band signal transceiver 271. The switch SW4 turns on the transmission path for transmitting the base-band output signal BA1 to the frequency selecting filter 250 according to the mode selecting signal MODE. The switch SW5 is serially connected between the frequency selecting filter 250 and the base-band signal transceiver 272. The switch SW5 turns on the transmission path for transmitting the base-band output signal BA2 to the frequency selecting filter 250 according to the mode selecting signal MODE.

It should be noted that, within the switches SW3~SW5, at most one switch is turned on. When the switch SW3 is turned on, the switch SW1 is turned on as well. When the switch SW4 or the switch SW5 is turned on, the switch SW2 is turned on as well.

The base-band signal transceiver 271 includes a variable gain amplifier AMP4, an analog-to-digital converter ADC1, a digital-to-analog converter DAC1 and a base-band signal processor 2711. An input end of the variable gain amplifier AMP4 is coupled to the switch SW3 for receiving and amplifying the filtered mixed receiving signal MFRS. The analog-to-digital converter ADC1 coupled to the output end of the variable gain amplifier AMP4 converts the output signal of the variable gain amplifier AMP4 to a digital format for generating a digital receiving signal DIS1. The base-band signal processor 2711 is coupled to the analog-to-digital converter ADC1 for receiving the digital receiving signal DIS1. The base-band signal processor 2711 also generates a base-band output signal DOS1 which is digital. The digital-to-analog converter DAC1 is coupled to the base-band signal processor 2711 and the switch SW4. The digital-to-analog converter DAC1 converts the base-band output signal DOS1 which is digital to the base-band output signal BA1 which is analog.

The base-band signal transceiver 272 includes an analog-to-digital converter ADC2, a digital-to-analog converter DAC2 and a base-band signal processor 2721. The analog-to-digital converter ADC2 coupled to the output end of the variable gain amplifier AMP4 converts the output signal of the variable gain amplifier AMP4 to the digital format for generating a digital receiving signal DIS2. The base-band signal processor 2722 is coupled to the analog-to-digital converter ADC2 for receiving the digital receiving signal DIS2. The base-band signal processor 2722 also generates the base-band output signal DOS2 which is digital. The digital-to-analog converter DAC2 is coupled to the base-band signal processor 2722 and the switch SW5. The digital-to-analog converter DAC2 converts the base-band output signal DOS2 which is digital to the base-band output signal BA2 which is analog.

In overview, when the wireless signal transceiving apparatus 200 is intended to transmit the Bluetooth signal, the base-band signal processor 2711 generates the base-band output signal DOS1, and the base-band output signal DOS1 is converted to the analog format for generating the base-band output signal BA1 by digital-to-analog converter DAC1. The base-band output signal BA1 is transmitted to the frequency selecting filter 250 through the switch SW4 for filtering in order to generate the preamble output signal POS. The preamble output signal POS is transmitted to the mixer circuit 232 through the switch SW2 for mixing with the reference wave signal, and then the preamble output signal POS is amplified by the amplifier AMP2 for generating the output signal SOUT1. The transformer T1 provides the signal to the second end E2 and the first end E1 of the antenna converter 212 by coupling the output signal SOUT1 received by the second side of the transformer T1, and the signal is radiated through the antenna ANT.

When the wireless signal transceiving apparatus 200 is intended to transmit the wireless LAN signal, the base-band signal processor 2722 generates the base-band output signal DOS2, and the base-band output signal DOS2 is converted to the analog format for generating the base-band output signal BA2 by digital-to-analog converter DAC2. The base-band output signal BA2 is transmitted to the frequency selecting filter 250 through the switch SW5 for filtering in order to generate the preamble output signal POS. The preamble output signal POS is transmitted to the mixer circuit 232 through the switch SW2 for mixing with the reference wave signal, and then the preamble output signal POS is amplified by the amplifier AMP3 for generating the output signal SOUT2. The transformer T2 provides the signal to the third end E3 and the first end E1 of the antenna converter 212 by coupling the output signal SOUT2 received by the second side of the transformer T2, and the signal is radiated through the antenna ANT.

When the wireless signal transceiving apparatus 200 is intended to receive the Bluetooth signal or the wireless LAN signal, the second side of the transformer T1 couples the receiving signal received by the antenna ANT which is coupled to the first end of the transformer T1 and provides the receiving signal to be an input signal of the amplifier AMP1. The amplifier AMP1 amplifies the receiving signal, and transmits the amplified receiving signal to the mixer circuit 231. The mixer circuit 231 mixes the amplified receiving signal with the reference wave signal for generating the mixed receiving signal MRS. The switch SW1 which is turned on transmits the mixed receiving signal MRS to the frequency selecting filter 250. Simultaneously, the switch SW3 is turned on, and the filtered mixed receiving signal FMRS is transmitted to the variable gain amplifier AMP4. The output end of the variable gain amplifier AMP4 coupled to the digital-to-analog converters ADC1, ADC2. When the receiving signal is the Bluetooth signal, an analog-to-digital converting operation is performed on the receiving signal outputted from the output end of the variable gain amplifier AMP4 by the analog-to-digital converter ADC1 for generating the digital receiving signal DIS1, and the digital receiving signal DIS1 is transmitted to the base-band signal processor 2711. By contrast, when the receiving signal is the wireless LAN signal, an analog-to-digital converting operation is performed on the receiving signal outputted from the output end of the variable gain amplifier AMP4 by the analog-to-digital converter ADC2 for generating the digital receiving signal DIS2, and the digital receiving signal DIS2 is transmitted to the base-band signal processor 2722.

In summary, the present invention effectively combines a plurality of elements in the multi-standard wireless signal transceiving apparatus for reducing the number of the circuits without affecting the transmission performance of the wireless signal transceiving apparatus. Two or more standards of signals can be received or transmitted by a single antenna. Therefore, the production cost and the space for setting the wireless signal transceiving apparatus can be reduced, and the cost efficiency of the wireless signal transceiving apparatus can be increased.

For example, since the size of a mobile phone is smaller than a notebook, there is only one antenna is built in the mobile phone. It can be easily realized that, when the mobile phone need to transceive the Bluetooth signal and the wireless LAN signal by the same antenna, the multi-standard wireless signal transceiving apparatus can provide an interface for transceiving the Bluetooth signal and the wireless LAN signal without interference. That is, the multi-standard wireless signal transceiving apparatus may be a arbiter for judging to receive or transmit the Bluetooth signal or the wireless LAN signal through the antenna at one time period.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A wireless signal transceiving apparatus, comprising:
a signal transceiving-end circuit, coupled to an antenna;
a transceiving amplify module, coupled to the signal transceiving-end circuit, receiving and amplifying a receiving signal transmitted from the antenna, or amplifying and transmitting an output signal to the signal transceiving-end circuit;
an output amplify module, coupled to the transceiving amplify module and the signal transceiving-end circuit, amplifying and transmitting the output signal to the signal transceiving-end circuit;
a mixer, coupled to the transceiving amplify module and the output amplify module, receiving the receiving signal which is amplified and mixing the receiving signal to generate a mixed receiving signal, or mixing a preamble output signal to generate the output signal;
a frequency selecting filter, coupled to the mixer, filtering the mixed receiving signal or filtering one of a first and a second base-band output signal to generate the preamble output signal according to a mode selecting signal;
a first switch module, coupled between the mixer and the frequency selecting filter, transmitting the mixed receiving signal to the frequency selecting filter or transmitting the preamble output signal to the mixer according to the mode selecting signal;
a first and a second base-band signal transceivers, coupled to the frequency selecting filter, wherein the first base-band signal transceiver receives the mixed receiving signal which is filtered and/or transmits the first base-band output signal, the second base-band signal transceiver receives the mixed receiving signal which is filtered and/or transmits the second base-band output signal; and
a second switch module, coupled among the first base-band signal transceiver, the second base-band signal transceiver and the frequency selecting filter, the second switch module turning on a transmitting path for the first base-band output signal, the second base-band output signal and the mixed receiving signal which is filtered according to the mode selecting signal.

2. The wireless signal transceiving apparatus as claimed in claim 1, wherein the signal transceiving-end circuit comprises:
an antenna converter, having a first end, a second end and a third end, wherein the first end is coupled to the antenna;
a first transformer, having a first side and a second side, wherein the first side of the first transformer is coupled to the second end of the antenna converter, the second side of the first transformer is coupled to the transceiving amplify module; and
a second transformer, having a first side and a second side, wherein the first side of the second transformer is coupled to the third end of the antenna converter, the second side of the second transformer is coupled to the output amplify module,
wherein the antenna converter transmits the signal received by the antenna to the second end or the third end of the antenna converter, or the antenna converter transmits the signal received by the second end or the third end to the antenna in order to let the signal radiated by the antenna.

3. The wireless signal transceiving apparatus as claimed in claim 2, wherein the signal transceiving-end circuit further comprises:
a filter, serially connected within a coupling path which the antenna converter coupled to the antenna.

4. The wireless signal transceiving apparatus as claimed in claim 1, wherein the transceiving amplify module comprises:
a first amplifier, wherein an input end of the first amplifier receives the receiving signal, an output end of the first amplifier is coupled to the mixer; and
a second amplifier, wherein an output end of the second amplifier is coupled to the signal transceiving-end circuit, an input end of the second amplifier receives the output signal.

5. The wireless signal transceiving apparatus as claimed in claim 4, wherein the first amplifier is a low noise amplifier (LNA).

6. The wireless signal transceiving apparatus as claimed in claim 4, wherein the mixer comprises:
a first mixer circuit, coupled to the output end of the first amplifier, the first mixer circuit mixes a reference wave signal and the receiving signal which is amplified to generate the mixed receiving signal;
a second mixer circuit, coupled to the input end of the second amplifier, the second mixer circuit mixes the reference wave signal and the preamble output signal to generate the output signal; and
a reference wave generator, coupled to the first and the second mixer circuits, the reference wave generator is provides the reference wave signal.

7. The wireless signal transceiving apparatus as claimed in claim 4, wherein the first switch module comprises:
a first switch, serially connected within a coupling path of the mixer coupling to the frequency selecting filter, transmitting the mixed receiving signal to the frequency selecting filter according to the mode selecting signal; and
a second switch, serially connected within the coupling path of the mixer coupling to the frequency selecting filter, transmitting the preamble output signal to the mixer according to the mode selecting signal,
wherein the first and the second switch can be a turn-on state or a turn-off state, and the states of the first switch and the second switch are different.

8. The wireless signal transceiving apparatus as claimed in claim 1, wherein the second switch module comprises:
a third switch, serially connected between the frequency selecting filter and the first base-band signal transceiver, turning on the transmission path to the first base-band signal transceiver for the mixed receiving signal which is filtered according to the mode selecting signal;
a fourth switch, serially connected between the frequency selecting filter and the first base-band signal transceiver, turning on the transmission path to the frequency selecting filter for the first base-band output signal according to the mode selecting signal; and
a fifth switch, serially connected between the frequency selecting filter and the second base-band signal transceiver, turning on the transmission path to the frequency selecting filter for the second base-band output signal according to the mode selecting signal.

9. The wireless signal transceiving apparatus as claimed in claim 8, wherein at most one of the third switch, the fourth switch and the fifth switch is turned on.

10. The wireless signal transceiving apparatus as claimed in claim 1, wherein the first base-band signal transceiver comprises:
a variable gain amplifier, an input end of the variable gain amplifier is coupled to the second switch module, wherein the variable gain amplifier receives and amplifies the mixed receiving signal which is filtered;
a first analog-to-digital converter, coupled to an output end of the variable gain amplifier, converting an output signal of the variable gain amplifier to a digital format in order to generate a first digital receiving signal;
a first base-band signal processor, coupled to the analog-to-digital converter to receive the first digital receiving signal, wherein the first base-band signal processor generates the first base-band output signal which is digital; and
a first digital-to-analog converter, coupled to the first base-band signal processor and the second switch module, converting the first base-band output signal in digital format to the first base-band output in analog format.

11. The wireless signal transceiving apparatus as claimed in claim 10, wherein the first base-band signal transceiver comprises:
a second analog-to-digital converter, coupled to the output end of the variable gain amplifier, converting the output signal of the variable gain amplifier to digital format in order to generate a second digital receiving signal;
a second base-band signal processor, coupled to the analog-to-digital converter to receive the second digital receiving signal, wherein the second base-band signal processor generates the second base-band output signal which is digital; and
a second digital-to-analog converter, coupled to the second base-band signal processor and the second switch module, converting the second base-band output signal which is in digital format to the second base-band output signal which is in analog format.

12. The wireless signal transceiving apparatus as claimed in claim 1, wherein the first base-band signal transceiver is a Bluetooth base-band signal transceiver, and the second base-band signal transceiver is a wireless LAN base-band signal transceiver.

13. The wireless signal transceiving apparatus as claimed in claim 1, further comprising:
a controller, coupled to the frequency selecting filter and the second switch module to generate the mode selecting signal.

* * * * *